UNITED STATES PATENT OFFICE.

FREDERIC M. ENDLICH AND NICHOLAS H. MUHLENBERG, OF LAKE VALLEY, TERRITORY OF NEW MEXICO.

PROCESS OF SEPARATING PRODUCTS OF LIXIVIATION AND SIMILAR COMPOUNDS.

SPECIFICATION forming part of Letters Patent No. 350,670, dated October 12, 1886.

Application filed January 29, 1886. Serial No. 190,238. (No specimens.)

*To all whom it may concern:*

Be it known that we, FREDERIC M. ENDLICH and NICHOLAS H. MUHLENBERG, both of Lake Valley, county of Sierra, and Territory of New Mexico, have invented a certain new and useful Improvement in Processes of Separating Products of Lixiviation and Similar Compounds; and we do hereby declare that the following is a full, clear, and exact description thereof.

In the process of leaching or lixiviating ores or metallurgical products, which consists in extracting the valuable metals from the roasted ore by treating the latter with hyposulphite solution and precipitating the metals dissolved thereby from such solution by means of an alkaline sulphide, the marketable product, containing precious and base metals, consists in a compound containing, principally, silver, copper, lead, and sulphur. The treatment of this product is at present confined to operations involving the use of high degrees of heat for the purpose of roasting, smelting, and refining. The separation by heat is more or less imperfect and expensive in construction of plant and operating of the same.

For the purpose of separating the silver from the other metals which may be contained in the precipitated product obtained by various lixiviating processes, by Russell's process, as described in Letters Patent No. 295,815, or in similar compounds or metallurgical products, we proceed as follows: We use chlorine water—that is, water through which chlorine gas has been passed to the point of saturation, or less—for the purpose of digesting the precipitated sulphides of silver and base metals resulting from the use of lixivation processes and from other sources. It is immaterial whether the water previously saturated with chlorine gas is mixed with the materials above described, or whether pure water is mixed therewith, and then the chlorine gas passed through it to the point of saturation, or less, as the amount and nature of the material involved may demand. We find that heat accelerates the reaction and heat our solution by introducing steam-coils, live steam, or any other applicable method.

By the contact of sulphides of silver, copper, lead, iron, and other metals with the chlorine water, heated as above described, the sulphur of such compounds is replaced by chlorine very rapidly. Nearly all of the metallic chlorides thus formed, with the exception of chloride of silver, are wholly soluble in the chlorine water we use. We obtain, therefore, a solution containing chlorine compounds of copper, iron, lead, and other metals, and a residue composed of chloride of silver and free sulphur. The solution is decanted or filtered, and the residue is more or less pure chloride of silver. This can be reduced by various means—such as treatment in a lead bath, or by some other method of smelting.

As the lixiviation process known as the "Russell process" requires the use of copper sulphate or blue-stone in considerable quantities, we take the chloride solution, obtained as above described, and convert the copper contained therein into sulphate by the addition of sulphuric acid. This addition of sulphuric acid at the same time precipitates what lead may be contained in the solution in the form of lead sulphate, a marketable product. In case no copper sulphate is required or desirable, the copper can be recovered from the described solution by the immersion of scrap-iron, upon which it deposits in the form of cement-copper.

The objects of our invention are—

First. The separation of silver from other base and precious metals which have been leached out of the ores or metallurgical products by means of the hyposulphite-of-soda lixiviation process, and all modifications thereof, especially that modification known as "Russell's process" and referred to above, and which are contained in the precipitates derived from and obtained during the working of such processes, and from other similar compounds and metallurgical products. This separation leaves the residue in more valuable form than before and less bulky.

Second. By isolating the silver from the accompanying copper, lead, and other metals we put it into such form as to produce a very much higher grade bullion than before, and than is now produced by the direct melting of the total precipitated resultant product of the process, and effect a noticeable economy.

Third. We cheapen the Russell process in its general application by reproducing, at but slight cost, the blue-stone which the process requires, and which we recover from the solution.

Fourth. We recover both copper and lead from the solution in marketable form at a trifling expense.

Having thus described our invention, what we claim is—

1. In the process of lixiviating or leaching ores, the method of bringing into solution metals other than silver contained in the sulphides precipitated from the leaching solution, which consists in adding chlorine water to such precipitated sulphides and heating the same, whereby the sulphides are rapidly converted into chlorides, the soluble metallic chlorides go into solution, while the insoluble chloride of silver is obtained as a precipitate, substantially as described.

2. In the process of lixiviating ores by hyposulphite solution, the method of separating lead and copper from silver and obtaining them in an available form, which consists in treating the precipitate obtained from the hyposulphite solution by alkaline sulphides with chlorine water, whereby insoluble silver chloride and soluble chlorides of the other metals are obtained, separating the latter from the silver chloride, and adding to the solution of soluble chlorides sulphuric acid, whereby insoluble lead sulphate is precipitated and soluble copper sulphate is formed, which two salts are then separated, substantially as described.

In testimony that we claim the foregoing we have hereunto set our hands this 18th day of December, A. D. 1885.

FREDERIC M. ENDLICH.
NICHOLAS H. MUHLENBERG.

Witnesses:
E. G. WICKS,
G. G. POSEY.